UNITED STATES PATENT OFFICE.

MAX KUGEL, OF LEVERKUSEN, NEAR COLOGNE, GERMANY, ASSIGNOR TO FARBEN-FABRIKEN VORM. FRIEDR. BAYER & CO., OF ELBERFELD, GERMANY, A CORPORATION OF GERMANY.

ANTHRAQUINONE VAT DYE.

985,352.  Specification of Letters Patent.  Patented Feb. 28, 1911.

No Drawing.  Application filed August 25, 1910. Serial No. 578,908.

*To all whom it may concern:*

Be it known that I, MAX KUGEL, doctor of philosophy, chemist, citizen of the German Empire, residing at Leverkusen, near Cologne, Germany, have invented a New Vat Dye, of which the following is a specification.

According to United States Letters Patents Nos. 775367, 775368 and 775369, amino- or alkylaminoanthraquinones containing halogen in ortho position can be easily converted into hydroazins (indanthrenes) by elimination of hydrogen halid. I have now made the surprising discovery that by treating in the same way an equimolecular mixture of two different components, the resulting products do not consist, as might have been expected, of mixtures of different indanthrenes but are chemical individuals which are produced by the combination of the two different molecules, e.. g. molecular quantities of 1-amino-2-bromo- and 1-methylamino-2-bromoanthraquinone yield monomethylindanthrene in accordance with the following equation:

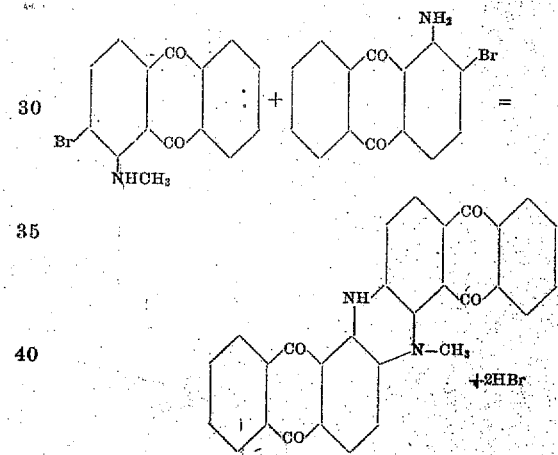

The new dyes are after being dried and pulverized blue powders soluble in boiling nitrobenzene with from a blue to blue green color; soluble in concentrated sulfuric acid with from a yellowish-brown to green color; being transformed into hydro compounds on suitable reduction with hydrosulfite and caustic soda lye, the alkaline solution thus obtained exhibiting the typical properties of a "vat," which dyes the fiber pure blue to green-blue shades.

In order to illustrate the new process more fully the following example is given, the parts being by weight: 10 parts of 1-amino-2-bromoanthraquinone, 10.5 parts of 1-monomethylamino-2-bromoanthraquinone, 10 parts of anhydrous sodium acetate, 0.5 parts of anhydrous copper sulfate are heated to boiling with 200 parts of naphthalene until the formation of the dye is completed. The dye is filtered off, washed with naphtha, alcohol and hot water. It crystallizes in dark blue needles difficultly soluble with a blue color in nitrobenzene and anilin, soluble in concentrated sulfuric acid with a yellowish-brown color. It dyes cotton from a hydrosulfite vat in blue shades. The dyes thus obtained possess the remarkable property of dyeing full and deep shades even from a cold vat, while the known indanthrenes are only capable of dyeing from a warm vat. This property renders it possible to use these dyes in conjunction with other vat dyes e. g. with the benzoylaminoanthraquinones and enables the dyer to produce a large variety of fast shades.

10 kilos of a 10 per cent. paste of methylindanthrene (see example) are mixed with 40 liters of water of 40° C., 4 liters caustic soda lye (36° Bé.) and 30 liters of hydrosulfite (17° Bé.) are added. The mixture is well stirred until the color is dissolved, which requires about 20 minutes. This solution is passed through a sieve into the dye-bath which consists of 1,000 liters of cold water, to which ¼ liter of caustic soda lye (30° Bé.), 1 liter hydrosulfite solution (17° Bé.) and 40 kilos of common salt have been added. The bath is well stirred and 50 kilos of cotton yarn after having been well wetted out are entered. The cotton is worked for ¾ to 1 hour in the cold. After dyeing the goods are squeezed out well exposed, rinsed, acidulated with a solution containing 1-2 cubic centimenters of sulfuric acid (66° Bé.) in 1 liter of water, rinsed and soaped at the boil. A very fast even blue results. Wool and silk are dyed in an analogous manner at about 30-40° C.

I claim:—

1. The herein described new dyestuffs being hydroazin derivatives of the anthracene series, which can be obtained by heating in the presence of metallic salts equimolecular mixtures of ortho-halogen substituted aminoanthraquinones and ortho-halogenalkylaminoanthraquinones, which dyes are after being dried and pulverized blue powders soluble in boiling nitrobenzene with a blue to blue-green color; soluble in concentrated sulfuric acid with from a yellowish-brown to green color; being transformed into hydro-compounds on suitable reduction with hydrosulfite and caustic soda lye, the alkaline solution thus obtained exhibiting the typical properties of a "vat" which dyes the fiber pure blue to green-blue shades, substantially as described.

2. The herein described new dyestuff being a hydroazin derivative of the anthracene series, which can be obtained from 1-methylamino-2-bromoanthraquinone and 1-amino-2-bromoanthraquinone, which dyestuff crystallizes in dark blue needles, difficultly soluble with a blue color in nitrobenzene and anilin, soluble in concentrated sulfuric acid with a yellowish-brown color; dyeing the fiber from a hydrosulfite vat in blue shades, substantially as described.

In testimony whereof I have hereunto set my hand in the presence of two subscribing witnesses.

MAX KUGEL. [L. S.]

Witnesses:
CHAS. J. WRIGHT,
WALTER VONNEGUT.